United States Patent [19]

New

[11] 3,902,388

[45] Sept. 2, 1975

[54] FRANKFURTER SKIN SLITTER

[76] Inventor: Robert C. New, 423 Sherwood Rd., Cockeysville, Md. 21030

[22] Filed: Jan. 18, 1974

[21] Appl. No.: 434,826

[52] U.S. Cl. .......................................... 83/9; 17/1 F
[51] Int. Cl.² .................... B26D 3/08; A22C 9/00
[58] Field of Search ......... 83/6, 9, 11, 12, 284, 407, 83/425.3, 435.2; 17/25, 27, 1 F

[56] References Cited
UNITED STATES PATENTS

| | | | |
|---|---|---|---|
| 1,907,413 | 5/1933 | Anderson et al. | 83/11 X |
| 2,263,869 | 11/1941 | Bundschu | 83/12 X |
| 2,735,466 | 2/1956 | Krstinich | 83/440 X |
| 3,257,725 | 6/1966 | Dignard | 17/1 F |
| 3,786,703 | 1/1974 | Piel | 83/11 X |

Primary Examiner—Willie G. Abercrombie

[57] ABSTRACT

This invention provides a method of incising a number of uniform slits perpendicular to the long axis in the outer surface of a frankfurter or similar item, by means of a machine utilizing a complex of knives in a holder being moved across the surface of the frankfurter.

3 Claims, 4 Drawing Figures

PATENTED SEP 2 1975　　3,902,388

FRANKFURTER SKIN SLITTER

The purpose of this invention is to provide multiple uniform slits around the circumference of a frankfurter or similar item, hereinafter referred to simply as "frankfurter," at a predetermined distance apart and at an exact predetermined depth, and on a plane approximately perpendicular to the long axis.

The object of the slits is to enhance the eye-appeal of the frankfurter when it is subsequently cooked and the slits open up into wide grooves running completely around the frankfurter.

The machine invented for the purpose of incising these slits is very simple and uncomplicated and lends itself to either a manual or highspeed powered operation.

Figure 1:
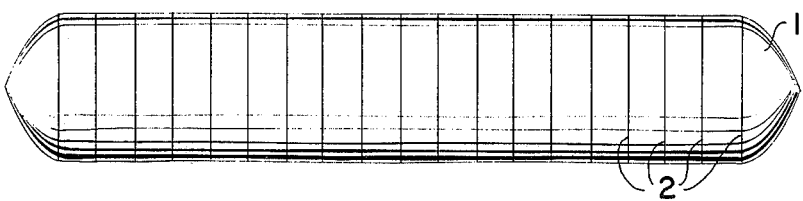

For the purpose of clarification the attached drawings are provided:

FIG. 1. The frankfurter showing the slits in the skin after it has been processed through this invention.

Figure 2:
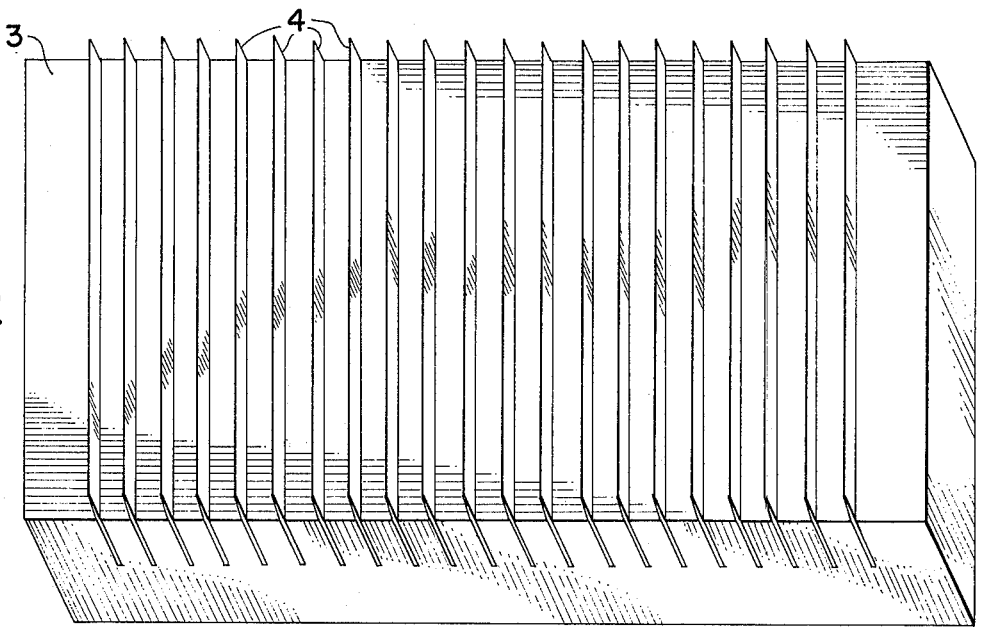

FIG. 2. An inverted view of the complex of knives in their holder, hereinafter referred to as the "knifeblock," used to make the slits.

Figure 3:
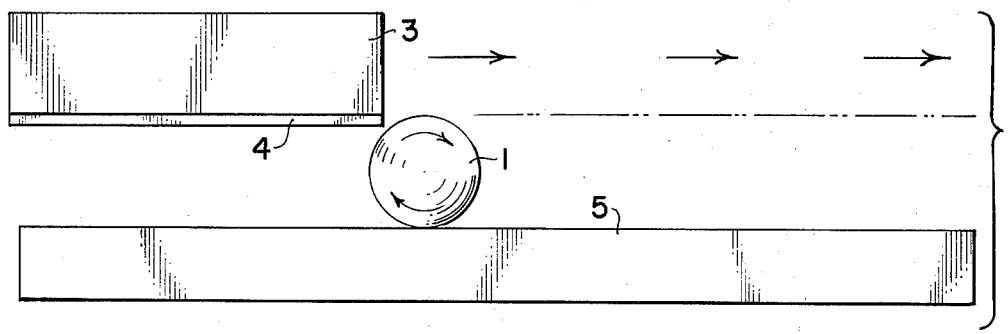

FIG. 3. Manual machine showing the basic essentials of this invention.

Figure 4:
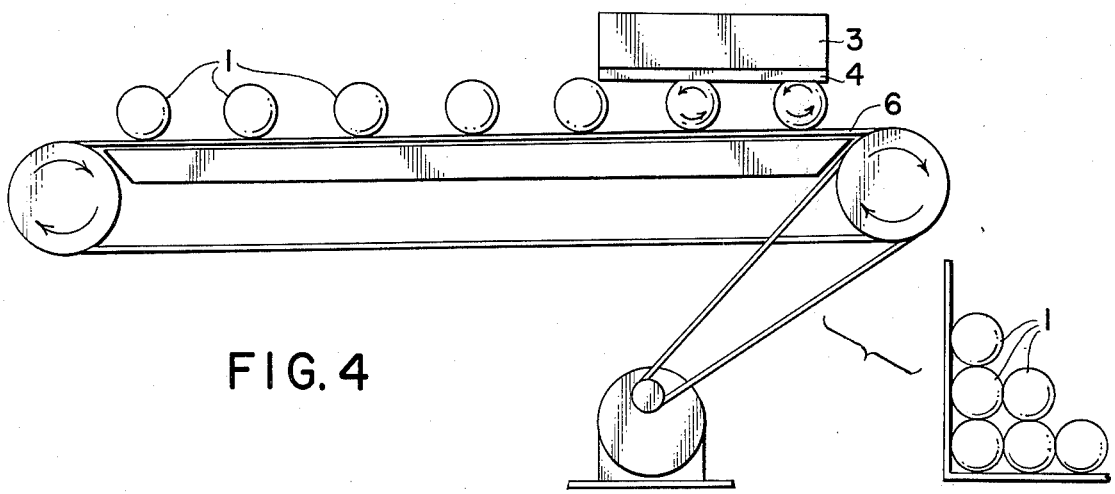

FIG. 4. High Speed powered model of the same basic principle used in the manual machine.

The basic principle of this invention is the fact that when a softskinned frankfurter 1 is rolled across a very sharp knife (or knives) 4 with a minimum of pressure, the knife will easily pierce the outside surface wherever contact is made.

This invention is novel and unique because it makes use of this principle by means of a complex of parallel straight knives locked in a holder 3 wherein the protrusion of each knife and the distance between knives can be accurately controlled, thereby also accurately determining the depth of each slit and the distance between slits (See FIG. 2). Since it is not inherently essential that the knives be straight or parallel or uniformly equidistant, but only preferable, this should not be construed as a limitation.

In the manual model FIG. 3 the frankfurter is placed on a platform 5 and the knifeblock 3 is moved forward over the surface of the frankfurter 1 with sufficient downward pressure to cause the blades to pierce the skin and causing the frankfurter to roll beneath the blades thereby providing slits 2 from each blade around the entire circumference (See FIG. 3 & FIG. 1). For the purpose of visual clarity the structure which supports both ends of the knifeblock and which consists of a very simple tract used to maintain a uniform distance between the knifeblock 3 and the platform 5 has been omitted except for the dotted line illustrating its location. Since the basic principle of this invention is to roll the frankfurter 1 over the knives 4 by any means, it would be just as practical to lock the knifeblock 3 in position and move the platform 5 beneath the frankfurter 1 in much the same way as a conveyor 6 is used in the powered model described below.

In the powered model FIG. 4 the frankfurters 1 are stacked on a conveyor 6 by any means and are conveyed under the knifeblock 3 which is locked in place in a position above the conveyor 6 uniformly equidistant throughout its blades 4 from the conveyor 6, and slightly less than the diameter of the frankfurter 1. As each frankfurter reaches the knives it begins to roll (See FIG. 4) across the surface of the knives 4 leaving the desired slits 2 in the surface.

Having thus described my invention, what I claim as new and desire to secure by United States Patent is:

1. A device for Slitting a frankfurter to a predetermined depth comprising horizontally disposed support means adapted to support frankfurters in a transverse position, a knifeblock disposed above said support means, a plurality of parallel elongated knives mounted in said knifeblock, said knives being spaced a distance above said support means less than the thickness of a frankfurter, means for causing relative movement between said support means and said knifeblock, whereby frankfurters will be rotated about their elongated axis as they pass beneath the knifeblock as they engage the knives resulting in parallel slits about the circumference of the frankfurter.

2. A device according to claim 2 wherein said support means is a platform.

3. A device according to claim 2 wherein said support means is a conveyor.

* * * * *